United States Patent
Harchol-Balter et al.

(10) Patent No.: US 8,806,018 B2
(45) Date of Patent: Aug. 12, 2014

(54) DYNAMIC CAPACITY MANAGEMENT OF MULTIPLE PARALLEL-CONNECTED COMPUTING RESOURCES

(75) Inventors: Mor Harchol-Balter, Pittsburgh, PA (US); Anshul Gandhi, Pittsburgh, PA (US); Varun Gupta, Pittsburgh, PA (US); Michael Kozuch, Export, PA (US)

(73) Assignees: Carnegie Mellon University, Pittsburgh, PA (US); Intel Corporation, Santa Clara, CA (US)

( * ) Notice: Subject to any disclaimer, the term of this patent is extended or adjusted under 35 U.S.C. 154(b) by 309 days.

(21) Appl. No.: 13/436,271

(22) Filed: Mar. 30, 2012

(65) Prior Publication Data

US 2012/0254444 A1    Oct. 4, 2012

Related U.S. Application Data

(60) Provisional application No. 61/516,330, filed on Apr. 1, 2011.

(51) Int. Cl.
*G06F 15/173* (2006.01)
*G06F 9/06* (2006.01)

(52) U.S. Cl.
CPC ........................................ *G06F 9/06* (2013.01)
USPC ......................................................... 709/226

(58) Field of Classification Search
CPC ........................................................ G06F 9/06
USPC ........................................................... 709/226
See application file for complete search history.

(56) References Cited

U.S. PATENT DOCUMENTS

| | | | |
|---|---|---|---|
| 8,250,198 B2 * | 8/2012 | Zhang et al. | 709/223 |
| 2011/0040876 A1 * | 2/2011 | Zhang et al. | 709/226 |
| 2011/0264805 A1 * | 10/2011 | Breitgand et al. | 709/226 |
| 2011/0302578 A1 * | 12/2011 | Isci et al. | 718/1 |

* cited by examiner

*Primary Examiner* — Vivek Srivastava
*Assistant Examiner* — Nicholas Celani
(74) *Attorney, Agent, or Firm* — Downs Rachlin Martin PLLC

(57) ABSTRACT

A dynamic capacity management policy for multi-paralleled computing resources (e.g., application servers, virtual application servers, etc.) that includes one or more of a state-change component, a load-balancing component, and a robustness-control component. The state-change component delays the release (e.g., powering down of a physical server, removal from a virtual-server lease, etc.) of each computing resource for a set amount of time. The load-balancing component can work in conjunction with the state-change component to reduce the number of idle computing resources by distributing incoming requests in a manner that keeps the already-processing computing resources as full of requests as possible. The robustness-control component scales capacity as a function of the current number of requests within the system of computing resources to account for variations other than request rate, such as request size, reduced processor frequency, network slowdowns, etc., that affect processing capacity.

9 Claims, 7 Drawing Sheets

| Trace | Policy | AlwaysOn | Reactive | Predictive MWA | Predictive LR | Opt | AutoScale-- |
|---|---|---|---|---|---|---|---|
| Slowly varying [ita 1998] | $T_{95}$ | 271ms | 673ms | 3,464ms | 618ms | 366ms | 435ms |
| | $P_{avg}$ | 2,205W | 842W | 825W | 964W | 788W | 1,393W |
| | $N_{avg}$ | 14.0 | 4.1 | 4.1 | 4.9 | 4.0 | 5.8 |
| Quickly varying | $T_{95}$ | 303ms | 20,005ms | 3,335ms | 12,553ms | 325ms | 362ms |
| | $P_{avg}$ | 2,476W | 1,922W | 2,065W | 3,622W | 1,531W | 2,205W |
| | $N_{avg}$ | 14.0 | 10.1 | 10.6 | 22.1 | 8.2 | 15.1 |
| Big spike [nlanr 1995] | $T_{95}$ | 229ms | 3,426ms | 9,337ms | 1,753ms | 352ms | 854ms |
| | $P_{avg}$ | 2,260W | 985W | 998W | 1,503W | 845W | 1,129W |
| | $N_{avg}$ | 14.0 | 4.9 | 4.9 | 8.1 | 4.5 | 6.6 |
| Dual phase [nlanr 1995] | $T_{95}$ | 291ms | 11,003ms | 7,740ms | 2,544ms | 320ms | 491ms |
| | $P_{avg}$ | 2,323W | 1,281W | 1,276W | 2,161W | 1,132W | 1,297W |
| | $N_{avg}$ | 14.0 | 6.2 | 6.3 | 11.8 | 5.9 | 7.2 |
| Large variations [nlanr 1995] | $T_{95}$ | 289ms | 4,227ms | 13,339ms | 20,631ms | 321ms | 474ms |
| | $P_{avg}$ | 2,363W | 1,391W | 1,461W | 2,576W | 1,222W | 1,642W |
| | $N_{avg}$ | 14.0 | 7.8 | 8.1 | 16.4 | 7.1 | 10.5 |
| Steep tri phase [sap 2011] | $T_{95}$ | 377ms | > 1 min | > 1 min | 661ms | 446ms | 463ms |
| | $P_{avg}$ | 2,263W | 849W | 1,287W | 3,374W | 1,004W | 1,601W |
| | $N_{avg}$ | 14.0 | 5.2 | 7.2 | 20.5 | 5.1 | 8.0 |

FIG. 4

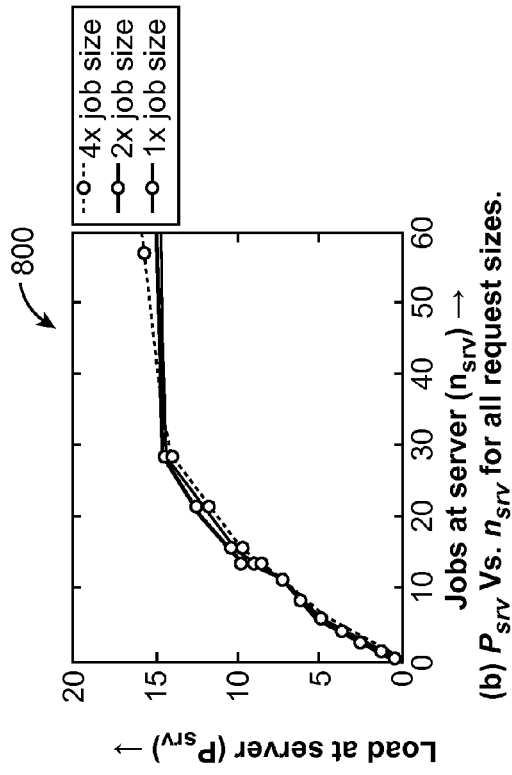
FIG. 7
FIG. 8
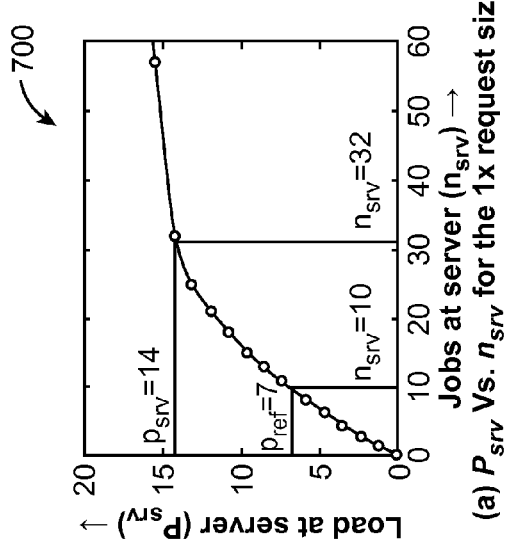
| Trace | Policy | AlwaysOn | Reactive | Predictive MWA | Predictive LR | Opt | AutoScale |
|---|---|---|---|---|---|---|---|
| Slowly varying [ita 1998] | $T_{95}$ | 478ms | > 1 min | > 1 min | > 1 min | 531ms | 701ms |
| | $P_{avg}$ | 2,127W | 541W | 597 W | 728W | 667W | 923W |
| | $N_{avg}$ | 14.0 | 3.2 | 2.7 | 3.8 | 4.0 | 5.4 |
| Dual phase [nlanr 1995] | $T_{95}$ | 424ms | > 1 min | > 1 min | > 1 min | 532ms | 726ms |
| | $P_{avg}$ | 2,190W | 603W | 678W | 1,306W | 996W | 1,324W |
| | $N_{avg}$ | 14.0 | 3.0 | 2.6 | 6.6 | 5.8 | 7.3 |
FIG. 9

| Trace | Policy | AlwaysOn | Reactive | Predictive MWA | Predictive LR | Opt | AutoScale |
|---|---|---|---|---|---|---|---|
| Slowly varying [ita 1998] | $T_{95}$ | 759ms | >1 min | >1 min | >1 min | 915ms | 1,155ms |
| | $P_{avg}$ | 2,095W | 280W | 315W | 391W | 630W | 977W |
| | $N_{avg}$ | 14.0 | 1.9 | 1.7 | 2.1 | 4.0 | 5.7 |
| Dual phase [nlanr 1995] | $T_{95}$ | 733ms | >1 min | >1 min | >1 min | 920ms | 1,217ms |
| | $P_{avg}$ | 2,165W | 340W | 389W | 656W | 985W | 1,304W |
| | $N_{avg}$ | 14.0 | 1.7 | 1.8 | 3.2 | 5.9 | 7.2 |

FIG. 10

| Trace | Policy | AlwaysOn | Reactive | Predictive MWA | Predictive LR | Opt | AutoScale |
|---|---|---|---|---|---|---|---|
| Slowly varying [ita 1998] | $T_{95}$ | 572ms | >1 min | >1 min | 3,339ms | 524ms | 760ms |
| | $P_{avg}$ | 2,132W | 903W | 945W | 863W | 638W | 1,123W |
| | $N_{avg}$ | 14.0 | 5.7 | 5.9 | 4.8 | 4.0 | 7.2 |
| Dual phase [nlanr 1995] | $T_{95}$ | 362ms | 24,401ms | 23,412ms | 2,527ms | 485ms | 564ms |
| | $P_{avg}$ | 2,147W | 1,210W | 1,240W | 2,058W | 1,027W | 1,756W |
| | $N_{avg}$ | 14.0 | 6.3 | 7.4 | 12.2 | 5.9 | 10.8 |

FIG. 11

DYNAMIC CAPACITY MANAGEMENT OF MULTIPLE PARALLEL-CONNECTED COMPUTING RESOURCES

STATEMENT REGARDING FEDERALLY SPONSORED RESEARCH AND DEVELOPMENT

This invention was made, at least in part, with government support under National Science Foundation Grant No. CNS-0615262. The United States government may have certain rights in this invention.

RELATED APPLICATION DATA

This application claims the benefit of priority of U.S. Provisional Patent Application Ser. No. 61/516,330, filed on Apr. 1, 2011, and titled "Methods, Systems and Apparatuses to Manage the Operating State of Computing Devices to Achieve Computational and Energy Efficiency," which is incorporated by reference herein in its entirety.

FIELD OF THE INVENTION

The present invention generally relates to the field of parallel-connected computing resources. In particular, the present invention is directed to dynamic capacity management of multiple parallel-connected computing resources.

BACKGROUND

Energy costs for data centers continue to rise, already exceeding $15 billion yearly. Sadly, much of this power is wasted. For example, many networked services, such as the FACEBOOK® social-networking service and AMAZON-.COM® e-commerce service, are provided by multi-tier data center infrastructures. A primary goal for these applications is to provide good response time to users; these response time targets typically translate to some response time service level agreements (SLAs). In an effort to meet these SLAs, data center operators typically over-provision the number of servers to meet their estimate of peak load. These servers are left "always on," leading to only 10-30% server utilization, despite virtualization. This is problematic, because servers that are on, but idle, still utilize 60% or more of peak power.

To reduce this waste, various researchers have considered intelligent dynamic capacity management, which aims to match the number of active servers with the current load. A goal of dynamic capacity management is to scale capacity with unpredictably changing load in the face of high setup costs. Part of what makes dynamic capacity management difficult is the setup cost of getting servers back on/ready. All of the prior work in this area of which the present inventors are aware has focused only on fluctuations in request rate. This is already a difficult problem, given high setup costs, and has resulted in many policies, including reactive approaches that aim to react to the current request rate, predictive approaches that aim to predict the future request rate, and mixed reactive-predictive approaches. However, in reality there are many other ways in which load can change. For example, request size (work associated with each request) can change if new features or security checks are added to the application. As a second example, server efficiency can change, if any abnormalities, such as internal service disruptions, slow networks, or maintenance cycles, occur in the system. These other types of load fluctuations are all too common in data centers, and have not been addressed by prior work in dynamic capacity management.

SUMMARY OF THE DISCLOSURE

In one implementation, the present disclosure is directed to a method of controlling a plurality of computing resources each having a lower-setup-cost state and a higher-setup-cost state. The method includes arranging the plurality of computing resources so that each is capable of processing at least a share of an incoming request stream; and controlling each of the plurality of computing resources so that each switches from the lower-setup-cost state to the higher-setup-cost state as a function of a timing-out of a state-change delay timer that is initiated when that computing resource is idled.

In another implementation, the present disclosure is directed to a processing system for processing an incoming request stream. The processing system includes a plurality of computing resources each capable of processing at least a share of the incoming request stream and having a lower-setup-cost state and a higher-setup-cost state; a load balancer designed and configured to distribute new arrivals within the incoming request stream among the plurality of computing resources; and a state-change delay timer for each of the plurality of computing resources; wherein: the state-change delay timer is designed and configured to start running as a function of the corresponding one of the plurality of computing resources becoming idle; and the corresponding one of the plurality of computing resources is switched from the lower-setup-cost state to the higher-setup-cost state as a function of a timing-out of the state-change delay timer.

In still another implementation, the present disclosure is directed to a machine readable storage medium containing machine-executable instructions for controlling a plurality of computing resources in processing an incoming request stream, wherein each of the plurality of computing resources has a lower-setup-cost state and a higher-setup-cost state. The machine-executable instructions include a first set of machine-executable instructions for distributing new arrivals in the incoming request stream as a function of a packing factor.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 is a table comparing the performance of the instantiation of the AutoScale—DCM policy to the performance of other DCM policies in the experimental testbed;

FIG. 7 is a graph of the load at a server versus the number of requests (jobs) at the server for a 1× request size in the experimental testbed;

FIG. 8 is a graph of the load at a server versus the number of requests (jobs) at the server for 1×, 2×, and 4× request sizes in the experimental testbed;

FIG. 9 is a table comparing the performance of the AutoScale DCM policy to the performance of other policies for the 2× request size in the experimental testbed;

FIG. 10 is a table comparing the performance of the AutoScale DCM policy to the performance of other policies for the 4× request size in the experimental testbed;

FIG. 11 is a table comparing the performance of the AutoScale DCM policy to the performance of other policies for a reduced CPU frequency in the experimental testbed.

DETAILED DESCRIPTION

Figure 1:
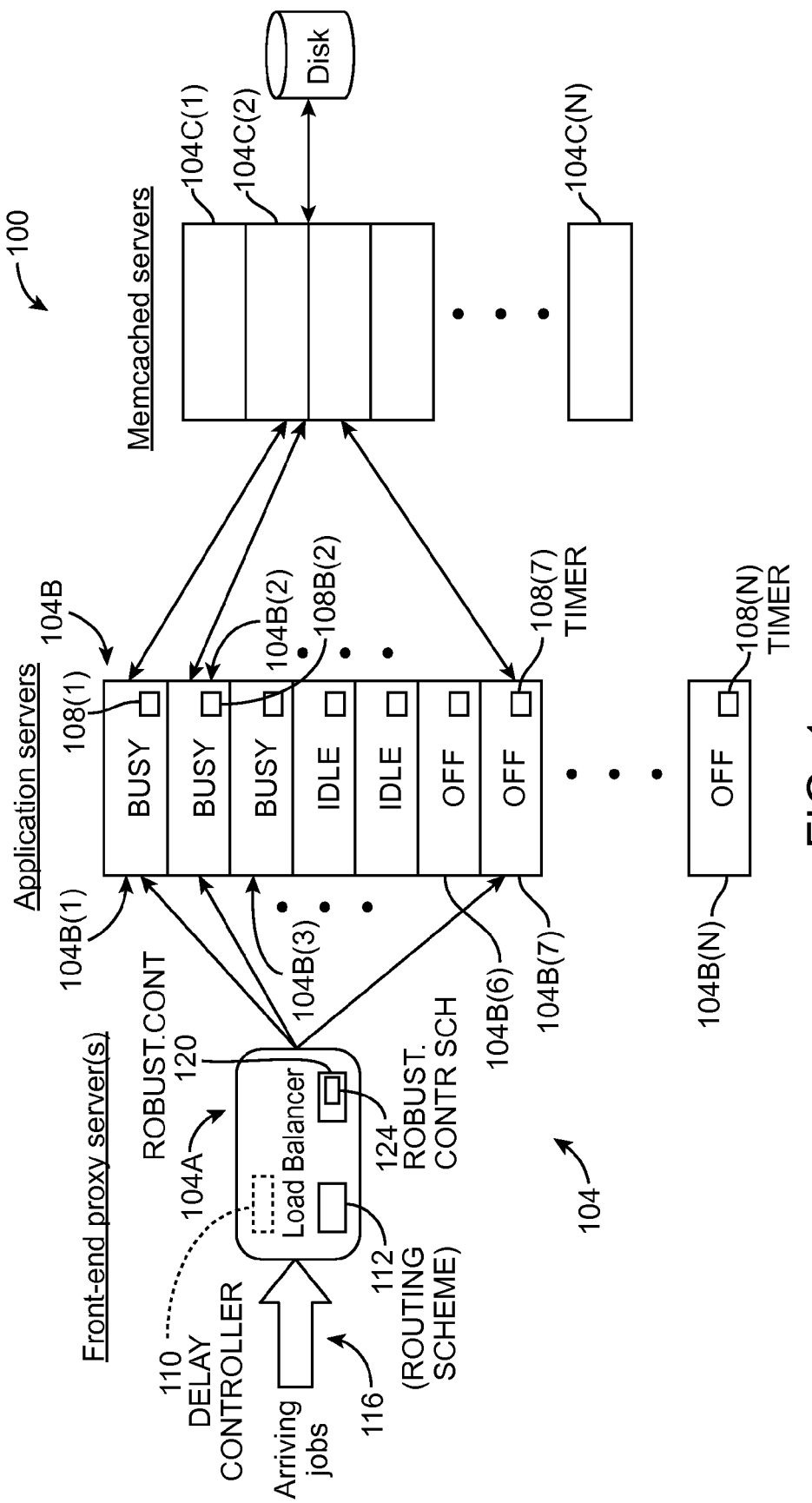
FIG. 1 is a high-level schematic diagram of an exemplary three-tiered multi-paralleled computing resource system made in accordance with the present invention.

As mentioned in the Background section above, while all prior work on dynamic capacity management (DCM) known to the present inventors has focused on arrival rate, loads on servers (and other computing resources) within multi-paralleled resource systems can fluctuate in other ways, such as request size and abnormalities within the systems themselves, such as internal service disruptions, slow networks, and maintenance cycles. One aspect of the present invention is a dynamic capacity management scheme, or method, that handles all forms of changes in load. Such a method is referred to herein for convenience as an "AutoScale" DCM method. Other aspects of the present invention include multi-paralleled resource systems that utilize an AutoScale DCM method of the present disclosure, as well as apparatuses and machine-readable storage media that embody one or more components of an AutoScale DCM method of the present disclosure. Regarding such components, after reading this entire disclosure, those skilled in the art will readily appreciate that there are at least three components to an AutoScale DCM method, namely, a computing resource state-change component, a load-balancing component, and a robustness-control component. Each of these components are described in detail below in conjunction with an exemplary multi-paralleled computing resource system 100 that is illustrated in FIG. 1.

However, before turning to a detailed example, several general principles underlying an AutoScale DCM method are addressed first. Underlying an AutoScale DCM method of the present invention is a requirement that each computing resource implementing an AutoScale DCM method have at least two states that have differing setup costs. These states are referred to herein and in the appended claims as a "lower-setup-cost state" and a "higher-setup-cost state" for, respectively, a state having a lower setup cost relative to the higher-setup-cost state and a state having a higher setup cost relative to the lower-setup-cost state. As those skilled in the art will readily appreciate, the setup cost involved can be expressed in a variety of ways. For example, the setup cost can be expressed in terms of the time needed for a computing resource to transition from the higher-setup-cost state to the lower-setup-cost state. In a two-state (e.g., on or off) computing resource, for example, an application server in a server farm, the higher-setup-cost state is the off state, and the setup cost is the typically significant amount of time that the server needs to power/boot up to the on state. In that system, the lower-setup-cost state is the powered-up state wherein the setup cost is essentially zero as it sits powered up but idle, waiting to receive and process a request. For a physical server, another component of the setup cost can be the electrical energy needed to power the server while it powers up.

As another example, some computing resources may have one or more reduced-power-consumption states, such as a sleep state, for which the recovery time to a fully operational state is lower relative to a resource having only on and off states. Despite the lower setup cost disparity between the lower-setup-cost state and the higher-setup cost state (here, a sleep state, for example) as compared to an on-off situation, an AutoScale DCM method of the present invention can still provide reductions in power consumption over traditional computing resource management schemes. As a further example, in the context of computing resources being virtual servers, the setup cost can be the monetary cost (e.g., rental cost) and/or time or other transactional cost(s) needed to acquire one or more additional virtual servers, as needed to satisfy a current or projected workload.

As will be seen below, the state-change component of an AutoScale DCM method of the present invention addresses DCM in a much different way than conventional DCM methods. While prior approaches of which the present inventors are aware aim at predicting the future request rate and scaling up the number of servers to meet this predicted rate, which is clearly difficult to do when request rate is, by definition, unpredictable, an AutoScale DCM method of the present disclosure does not attempt to predict future request rate. Instead, such an AutoScale DCM method demonstrates that it is possible to meet service level agreements (SLAs) for many real-world workloads by simply being conservative in scaling down the number of servers, i.e., not turning servers off recklessly. One might think that this same effect could be achieved by leaving a fixed buffer of, say, 20% extra servers on at all times; however, an AutoScale DCM method of the present invention is able to greatly outperform such ad-hoc policies by maintaining just the right number of servers in the low-setup-cost (e.g., on) state. In experiments, the present inventors evaluated various components and aspects of an exemplary embodiment of the AutoScale DCM method on a suite of six different real-world workload traces, comparing it against five different capacity management policies commonly used in the literature. The experiments demonstrate that in all cases, the AutoScale DCM method significantly outperforms other policies, meeting response time SLAs while greatly reducing the number of servers needed.

To handle a broader spectrum of possible changes in load, including unpredictable changes in the request size and server efficiency, an AutoScale DCM method of the present invention can include a robustness-control component, described below in detail. Known prior approaches to DCM use only the request rate to determine capacity, making them not robust to these other changes in load. In contrast, one embodiment of the robustness-control component of the present invention uses a novel capacity inference algorithm, which allows it to determine the appropriate capacity regardless of the source of the change in load. Importantly, the robustness-control component achieves this without requiring any knowledge of the request rate or the request size or the efficiency of each computing resource.

The present invention overturns the common wisdom that in order to provision capacity one needs to know the future and plan for it, which is at the heart of the existing predictive-type DCM policies of which the present inventors are aware. Such predictions are simply not possible when workloads are unpredictable, and, the present invention furthermore shows they are unnecessary, at least for the range of variability investigated so far. The present invention demonstrates that provisioning carefully and not turning servers off recklessly achieves better performance than existing policies based on predicting current load or over-provisioning to account for possible future load. Performance benefits of the various aspects of the present invention cannot only be measured in terms of conventional predictive-type approaches. Indeed, provisioning policies made in accordance with the present invention outperform reactive policies as well.

As mentioned, in one embodiment the robustness-control component also introduces a capacity inference algorithm, which allows for determining an appropriate capacity at any point of time using a current state of the system. The present inventors have demonstrated that the robustness-control component of the present invention is robust to all forms of changes in load, including unpredictable changes in request size and unpredictable degradations in server speeds, within the range of the traces investigated so far, which included a slowly varying ITA trace, a quickly varying synthetic trace, a big-spike NLANR trace, a dual-phase NLANR trace, a large-variations NLANR trace, and a steep tri-phase SAP trace, as detailed in the technical report Anshul Gandhi et al., "AutoScale: Dynamic, Robust Capacity Management for Multi-Tier Data Centers," CMU Technical Report CMU-CS-12-109 (hereinafter, "the AutoScale paper"), which is incorporated herein by reference for its descriptions of workload traces, as well as descriptions of the various features of the AutoScale DCM methods described therein. As shown in that paper, the AutoScale DCM method can be made robust to even a 4-fold increase in request size using the embodiment of the robustness-control component disclosed herein. To the best of the present inventors' knowledge, a full version of the AutoScale DCM method of the present invention is the first policy to exhibit these forms of robustness. As shown in Tables IV, V and VI of that paper, other policies are simply not comparable on this front.

EXAMPLE

Referring now to the drawings, FIG. 1 illustrates an exemplary multi-paralleled computing resource system 100 that implements various aspects and features of the present invention. In this example, system 100 is a three-tiered system of servers 104, with the first tier comprising one or more servers, here only a single server 104A, deployed as a load balancer, the second tier comprising a plurality of servers 104B(1) to 104B(N) deployed as application servers, and the third tier comprising a plurality of servers 104C(1) to 104C(N) deployed as backend memcached servers. In the context of system 100, the term "multi-paralleled" refers to the computing resources, here application servers 104B(1) to 104B(N), that actively participate in the exemplary AutoScale DCM method. It is noted that while exemplary system 100 is a three-tiered system and that the AutoScale DCM method is applied only to application servers 104B(1) to 104B(N), the various aspects and features of an AutoScale DCM method of the present invention can be implemented in other multi-paralleled computing resource systems having any number of tiers and/or to any suitable tier within such system. That said, the illustrated three-tiered architecture is common among server systems for web sites of the type used by the FACE-BOOK social networking site and the AMAZON.COM ecommerce site, among many others. As those skilled in the art will readily appreciate, servers 104 can be a combination of any suitable hardware and software configured for executing its assigned function(s). Each server 104 can also be a virtual server that exists within a single physical computing resource machine or across two or more physical computing resource machines, as the case may be. Knowledge about conventional server hardware and conventional server software is ubiquitous, such that further explanation and details of these is not necessary for those skilled in the art to understand and implement any one or more of the various aspects of the present invention. However, an exemplary software-driven machine 1200 that can be used for each/any of servers 104 of system 100 of FIG. 1 is described below in connection with FIG. 12.

State-Change Component

Still referring to FIG. 1, as mentioned above a component of an AutoScale DCM method of the present invention is a component that effects a state change, individually within each application server 104B(1) to 104B(N), from a lower-setup-cost state to a higher-setup-cost state, such as from an on-but-idle state to an off or other reduced-power state. The present inventors have discovered that by delaying each server 104 in changing from a lower-setup-cost state to a higher-setup-cost state for a finite amount of time that the overall cost of operating system 100 can be reduced relative to not only scenarios that leave all application servers 104B(1) to 104B(N) on all the time, but also under conventional DCM policies, such as a Reactive policy, a Reactive policy with extra capacity, a moving window average predictive policy, and a linear regression policy. Details of these policies can be found in the AutoScale Paper, which is incorporated herein by reference for its descriptions of such conventional DCM policies.

Figure 2:
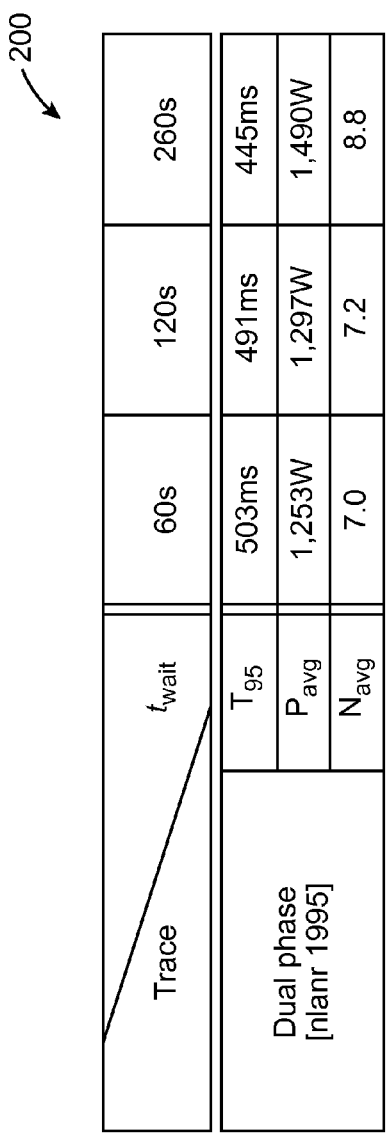
FIG. 2 is a table illustrating the insensitivity of one instantiation of an AutoScale—dynamic capacity management (DCM) policy of the present invention to the length of the state-change delay as implemented in an experimental testbed.

One way of implementing the state-change component of the AutoScale DCM method is to provide each application server 104B(1) to 104B(N) with a state-change delay tinier 108(1) to 108(N) that effects a state change in the corresponding server from a lower-setup-cost state to a higher-setup-cost state in response to timing out of the timer. As those skilled in the art will readily appreciate, each delay timer 108(1) to 108(N) can be triggered upon detection of the corresponding server 104B(1) to 104B(N) becoming idle, i.e., finishing the last processing request assigned to it. Each delay timer 108(1) to 108(N) can be programmed with a duration $t_{wait}$ that defines the amount of time that the corresponding server 10413(1) to 104B(N) stays on after processing the last request for that server. It is not until that delay timer 108(1) to 108(N) times out that the corresponding server 104B(1) to 104B(N) changes to the higher-setup-cost state. In an on/off scenario, if a request arrives at any one of servers 104B(1) to 104B(N) during these $t_{wait}$ seconds, then that server returns to its low-setup-cost state (typically, with essentially zero setup cost); otherwise that server is turned off. In experiments conducted by the present inventors, a $t_{wait}$ value of 120s was used. However, the table 200 in FIG. 2 shows that the effectiveness of the delayed state-change policy is largely insensitive to $t_{wait}$ in the range $t_{wait}$=60s to $t_{wait}$=260s, at least for the dual-phase NLANR type request rate trace. There is a slight increase in the average power consumption, $P_{avg}$, of the collection of application servers 104B(1) to 104B(N) (and correspondingly the average number, $N_{avg}$, of application servers that are on) and a slight decrease in the $95^{th}$-percentile response time, $T_{95}$, when $t_{wait}$ increases, due to idle servers staying on longer. It is noted that $T_{95}$ is a typical value for SLAs. The state-change component of the AutoScale DCM can also be applied to other SLAs such as mean response time or higher percentiles of response time, such as $99^{th}$-percentile, etc. As those skilled in the art will readily understand, each state-change delay timer 108(1) to 108(N) can be readily implemented in software within each application server 104B(1) to 104B(N) using well-known programming techniques.

While each application server 104B(1) to 104B(N) can be provided with its own state-change delay timer 108(1) to 108(N) as shown so that each server effectively operates autonomously in changing state, those skilled in the art will readily appreciate that there are other ways to implement the state-changing delay. For example, front-end server 104A can be provided with a state-change-delay controller 110 that tracks the states of all application servers 104B(1) to 104B(N) and delays the lower-setup-cost to higher-setup-cost state change of the idled ones of the application servers. Those skilled in the art will readily understand how such a state-change-delay controller 110 can be centrally implemented using appropriate state-tracking, timer algorithms, and communications with each of the application servers 104B(1) to 104B(N).

Load-Balancing Component

Each state-change delay timer 108(1) to 108(N) can prevent the mistake of turning off the corresponding application server 104B(1) to 104B(N) just as a new request comes into that server. However, state-changing delay timers 108(1) to 108(N) can also waste power and capacity by leaving too many of servers 104B(1) to 104B(N) in an idle state where they are consuming resources (e.g., electrical power, money to pay for the power, non-renewable resources used to generate the power, etc.) without processing any requests. Ideally, it is desirable to keep only a small number of servers 104B(1) to 104B(N) (just the right number) in such an idle state.

To do this, in this example load-balancing server 104A implements a routing scheme 112 that tends to concentrate processing requests onto a minimal number of application servers 104B(1) to 104B(N) so that the remaining (unneeded) application servers will naturally time-out. Generally, routing scheme 112 routes new incoming requests 116 to the one or more ("one(s)") of application servers 104B(1) to 104B(N) that are not idle but have additional capacity before they are processing at their desired maximum capacity, such as the capacity corresponding to an SLA that may be in place for system 100, depending upon the deployment of the system. In particular, among the servers that have additional capacity, the one with the least additional capacity is chosen. This is the most-recently-busy routing policy. An approximation of the most-recently-busy policy that is easier to implement is the index-packing policy. In this example, routing scheme 112 uses the index-packing approach, whereby all of application servers 104B(1) to 104B(N) currently in the lower-setup-cost state (e.g., an on state) are indexed from 1 to n. Then, routing scheme 112 sends new incoming requests to the lowest-numbered indexed server 104B(1) to 104B(N) that currently has fewer than p requests, where p stands for packing factor and denotes the maximum number of requests that a server can serve concurrently and meet its response time SLA.

Figure 3:
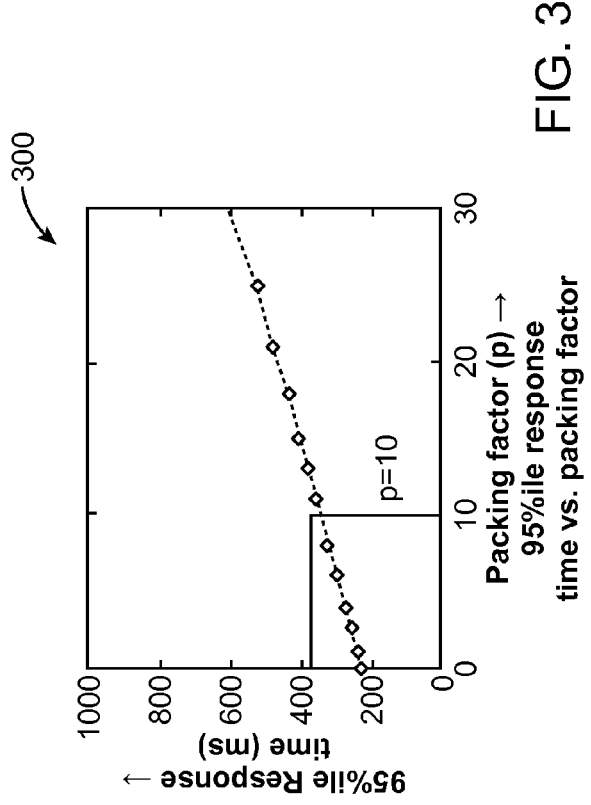
FIG. 3 is a graph of 95%-ile response time versus packing factor for a single server in the experimental testbed.

For example, graph 300 of FIG. 3 illustrates that to meet a 95%-ile guarantee of a 400 ms response time in a testbed experiment, packing factor p=10 requests. When all of the currently on one(s) of application servers 104B(1) to 104B(N) are already packed with p requests each, additional request arrivals are routed to the application server(s) via the join-the-shortest-queue routing. As seen in the table 400 of FIG. 4, in comparison with all the other policies investigated, this example of routing scheme 112 in combination with implementation of delay timers 108(1) to 108(N) (labeled "AutoScale-" in table 400) hits the "sweet spot" of low $T_{95}$ as well as low average power consumption, $P_{avg}$, and low average capacity (number of servers on), $N_{avg}$. As seen from table 400, the AutoScale-DCM policy is close to the response time SLA in all traces tested except for the one with the big sharp spike (labeled "Big spike" in the table). Simultaneously, the mean power usage and capacity under the AutoScale-DCM policy is typically significantly better than the policy in which all of application servers 1048(1) to 104B(N) are always on (labeled "AlwaysOn" in table 400), saving as much as a factor of two in power and capacity. It is noted that the policy labeled "Opt" is a fictitious optimal DCM policy that is identical to the "Reactive" policy, except that the setup time is taken as zero, i.e., there are no setup costs. The Opt policy was devised as a baseline to which DCM methods of the present invention can be compared.

Figures 5, 6:
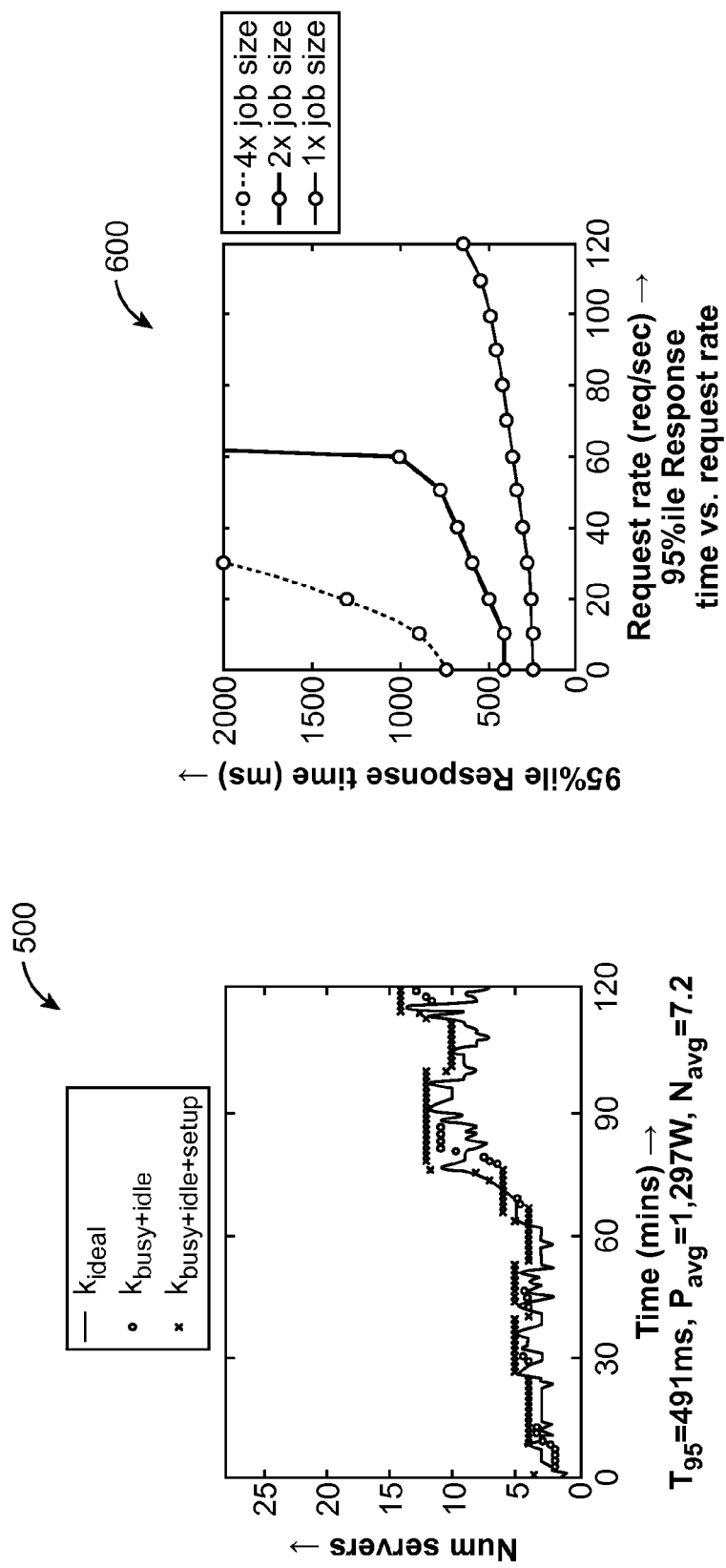
FIG. 5 is a graph of the number of servers versus time, illustrating the performance of the AutoScale—DCM policy in the experimental testbed.
FIG. 6 is a graph of 95%-ile response time versus request rate for three request sizes of 1×, 2×, and 4×, illustrating the degradation in response time for increasing request sizes in the experimental testbed.

The graph 500 in FIG. 5 illustrates how the AutoScale-DCM policy is able to achieve these performance results. Observe that the crosses and circles in the AutoScale-DCM policy form flat constant lines, instead of bouncing up and down, erratically, as occurs in other policies. This comes from a combination of the $t_{wait}$ timer and the index-based routing, which together keep the number of the on one(s) of application servers 104B(1) to 104B(N) just slightly above what is needed, while also avoiding toggling the application servers between on and off states when the load goes up and down.

Robustness-Control Component

Thus far, only the varying of the request rate over time has been considered. However and as mentioned above, in reality there are many other ways in which load can change. For example, if new features or security checks are added to an application, the request size might increase. As a second example, if any abnormalities occur in the system, such as internal service disruptions, slow networks, or maintenance cycles, servers may respond more slowly, and requests may accumulate at the servers. All the DCM policies addressed thus far, excluding the Opt policy, use the request rate to scale capacity. However, using the request rate to determine the required capacity is somewhat fragile. If the request size increases, or if the servers become slower, due to any of the reasons mentioned above, then the number of servers needed to maintain acceptable response times ought to be increased. In both cases, however, no additional capacity will be provisioned if the policies only look at request rate to scale up capacity.

Graph 600 of FIG. 6 shows the measured 95%-ile response time at a single application server versus request rate for different request sizes for an experimental setup. It is clear that while each application server can handle 60 req/s without violating the $T_{95}$ SLA for a 1× request size, the $T_{95}$ completely fall apart for the 2× and 4× request sizes. An obvious way to solve this problem is to determine the request size. However, it is not easy to determine the request size, since the size is usually not known ahead of time. Trying to derive the request size by monitoring the response times does not help either, since response times are usually affected by queuing delays.

Consequently, the present embodiment of the robustness control component uses the number of requests in the system, $n_{sys}$, as a means for scaling capacity rather than the request rate. It is asserted that $n_{sys}$ more faithfully captures the dynamic state of the system than the request rate. If the system is under-provisioned either because the request rate is too high or because the request size is too big or because the servers have slowed down, $n_{sys}$ will tend to increase. If the system is over-provisioned, $n_{sys}$ will tend to decrease below some expected level. Further, calculating $n_{sys}$ is fairly straightforward; many modern systems already track this value, and it is instantaneously available.

In order to implement this robustness scheme that accounts for varying request size, system 100 of FIG. 1 includes a robustness controller 120, which implements a robustness-control scheme 124. The exemplary embodiment of robustness-control scheme 124 differs from the existing capacity management policies mentioned herein in that it uses as the "control knob" rather than request rate. However, robustness-control scheme 124 (FIG. 1) does not simply scale up the capacity relative to application servers 104B(1) to 104B(N) linearly with an increase in $n_{sys}$, because $n_{sys}$ grows super-linearly during the time that system 100 is under-provisioned, as is well known in queuing theory. Instead, robustness-control scheme 124 infers the amount of work in system 100 by monitoring $n_{sys}$. The amount of work in system 100 is proportional to both the request rate and the request size (the request size in turn depends also on the efficiency of application servers 104B(1) to 104B(N)), and thus, robustness-control scheme 124 tries to infer the product of request rate and request size, called system load, $\rho_{sys}$, herein. Formally, $\rho_{sys}$=request rate into the data center($R$)×average request size wherein the average 1× request size is 120 ms in an experimental setup. Fortunately, there is an easy relationship (described below) to go from $n_{sys}$ to $\rho_{sys}$, obviating the need to ever measure load or request rate or the request size. Once $\rho_{sys}$ is obtained, it is easy to get to $k_{reqd}$, since $\rho_{sys}$ represents the amount of work in the system and is hence proportional to $k_{reqd}$. Following is an explanation of the process of translating $n_{sys}$ to $\rho_{sys}$, and then translating $\rho_{sys}$ to $k_{reqd}$. This entire translation algorithm is referred to herein as a "capacity inference algorithm." The full translation from $n_{sys}$ to $k_{reqd}$ is given in Equation 3 below.

In order to understand the relationship between $n_{sys}$ and $\rho_{sys}$, the relationship between the number of jobs at a single server, $n_{srv}$, and the load at a single server, $\rho_{srv}$, is first derived. Formally, the load at a server is defined as $$\rho_{srv}\text{=request rate into a single server}(r_{srv})\text{×average request size} \quad (1)$$

wherein the average 1× request size is 120 ms and $r_{srv}$ is the request rate into a single server. If the request rate, $r_{srv}$, is made as high as possible without violating the SLA, then the resulting $\rho_{srv}$ from Equation 1 is referred to as $\rho_{ref}$. For an experimental system used as an illustrative example, the maximum request rate into a single server without violating the SLA is $r_{srv}$=60 req/s. Thus, $$\rho_{ref}=60\times0.12\approx7 \quad (2)$$

meaning that a single server can handle a load of at most 7 requests without violating the SLA, assuming a 1× request size of 120 ms.

Returning to the discussion of how $\rho_{srv}$ and $n_{srv}$ are related, it is expected that $\rho_{srv}$ should increase with $n_{srv}$. Graph 700 of FIG. 7 shows experimental results for $\rho_{srv}$ as a function of $n_{srv}$ on the experimental system noted above. Note that $\rho_{srv}=\rho_{ref}$ corresponds to $n_{srv}=\rho=10$, where $\rho$ is the packing factor. Graph 700 is obtained by converting $r_{srv}$ to $\rho_{srv}$ using Equation 1, above. Observe from graph 700 that when $\rho_{srv}$ doubles from 7 to 14, we see that $n_{srv}$ more than triples from 10 to 32.

The system load, $\rho_{sys}$, is now estimated using the relationship between $n_{srv}$ and $\rho_{srv}$. To estimate $\rho_{sys}$, $n_{srv}$ is first approximated as $$\frac{n_{sys}}{k_{curr}},$$

wherein $k_{curr}$ is the current number of servers that are on (i.e., in the lower-setup-cost state). Graph 700 can then be used with $n_{srv}$ to estimate the corresponding $\rho_{srv}$. Then, the result is $\rho_{sys}=k_{curr}\cdot\rho_{srv}$.

Surprisingly, the experiments revealed that the relationship between $n_{srv}$ and $\rho_{srv}$ does not change when request size changes. Graph 800 of FIG. 8 shows experimental results for the relationship between $n_{srv}$ and $\rho_{srv}$ for different request sizes. From graph 800 it is seen that the plot is invariant to change in request sizes. Thus, while calculating $\rho_{sys}=k_{curr}\cdot\rho_{srv}$, the request size does not have to be considered, and graph 700 of FIG. 7 can be simply used to estimate $\rho_{sys}$ from $n_{sys}$ irrespective of the request size. Likewise, the experiments revealed that the relationship between $n_{srv}$ and $\rho_{srv}$ does not change when the server speed changes. This was because a decrease in server speed is the same as an increase in request size for the experimental system.

The reason why the relationship between $n_{srv}$ and $\rho_{srv}$ is agnostic to request size is because $\rho_{srv}$, by definition (see Equation 1, above), takes the request size into account. If the request size doubles, then the request rate into a server needs to drop by a factor of 2 in order to maintain the same $\rho_{srv}$. These changes result in exactly the same amount of work entering the system per unit time, and thus, $n_{srv}$ does not change. The insensitivity of the relationship between $n_{srv}$ and $\rho_{srv}$ to changes in request size is consistent with queuing-theoretic analysis. Interestingly, this insensitivity, coupled with the fact that $\rho$ is a constant for the experimental system, results in $\rho_{ref}$ being a constant for our system, since $\rho_{ref}$ is the same as $\rho_{srv}$ for the case when $n_{srv}=\rho=10$ (see graph 700 of FIG. 7). Thus, $\rho_{ref}$ needs to be computed only once for the system.

Having $\rho_{sys}$, it can be translated to $k_{reqd}$ using $\rho_{ref}$. Since $\rho_{sys}$ corresponds to the total system load, while $\rho_{ref}$ corresponds to the load that a single server can handle, it can be deduced that the required capacity is:

$$k_{reqd}=\left\lceil\frac{\rho_{sys}}{\rho_{ref}}\right\rceil$$

In summary, one can get from $n_{sys}$ to $k_{reqd}$ by first translating $n_{sys}$ to $\rho_{sys}$, which leads us to $k_{reqd}$, as outlined below:

$$n_{sys} \xrightarrow{\div k_{curr}} n_{srv} \xrightarrow{\text{FIG. 7}} \rho_{srv} \xrightarrow{\times k_{curr}} \rho_{sys} \xrightarrow{\div \rho_{ref}} k_{reqd} \quad (3)$$

For example, if $n_{sys}$=320 and $k_{curr}$=10, then $n_{srv}$=32, and from graph 700 of FIG. 7, $\rho_{srv}$=14, irrespective of request size. The load for the system, $\rho_{sys}$, is then given by $k_{curr}\cdot\rho_{srv}$=140, and since $\rho_{ref}$=7, the required capacity is $$k_{reqd}=\left\lceil k\cdot\frac{\rho_{srv}}{\rho_{ref}}\right\rceil=20$$

Consequently, the system would turn on 10 additional servers. Relating this to system 100 of FIG. 1, when robustness controller 120 is designed and configured to implement this robustness-control scheme 124 and the system has the characteristics of the experimental system in this example, it would turn on 10 additional ones of application servers 104B (1) to 104B(N). In one example, robustness controller 120 could do this by effectively overriding the corresponding ones of state-change delay timers 108(1) to 108(N). Of course, those skilled in the art will understand how to configure robustness controller and/or application servers 104B(1) to 104B(N) to ensure that the determined number of additional servers are in their lower-setup-cost states. In the experimental implementation, $k_{reqd}$ was recalculated every 20s to avoid excessive changes in the number of servers. However, other recalculation intervals can be used as desired/needed to suit a particular situation.

The insensitivity of the relationship between $n_{srv}$ and $\rho_{srv}$ allows the use of Equation 3 to compute the desired capacity, $k_{reqd}$, in response to any form of load change. Further, as noted above, $\rho$ and $\rho_{ref}$ are constants for the experimental system, and only needed to be computed once. These properties make this combination of the state-change, load-balancing, and robustness components (collectively referred to hereinafter as "the AutoScale DCM policy") a very robust dynamic capacity management policy.

Tables 900 and 1000 of FIGS. 9 and 10, respectively, summarize results for the case where the number of key-value lookups per request (or the request size) increases by a factor of 2 and 4, respectively. Because request sizes are dramatically larger, and because the number of servers in the experimental testbed was limited, the increase in request size was compensated for by scaling down the request rate by the same factor. Thus, in table 900 of FIG. 9, request sizes are a factor of two larger than in table 400 of FIG. 4, but the request rate is half that in table 400. The $T_{95}$ values are expected to increase as compared with table 200 of FIG. 2 because each request now takes longer to complete (since it does more key-value lookups).

Looking at the results for the AutoScale DCM policy in 900 of FIG. 9, it is seen that $T_{95}$ increases to around 700 ms, while in table 1000 of FIG. 10, it increases to around 1200 ms. This is to be expected. By contrast, for all other dynamic capacity management policies, the $T_{95}$ values exceed one minute, both in tables 900 and 1000. Again, this is because these policies react to changes in the request rate, and thus end up typically under-provisioning. The AlwaysOn policy knows the peak load ahead of time, and thus, always keeps $N_{avg}=14$ servers on. As expected, the $T_{95}$ values for the AlwaysOn policy are quite good, but $P_{avg}$ and $N_{avg}$ are very high. Comparing the AutoScale and Opt policies, it is seen that the fictitious Opt policy's power consumption and server usage is again only about 30% less than that of the AutoScale DCM policy.

Table 1100 illustrates another way in which load can change. Here, return is made to the 1× request size, but this time all servers have been slowed down to a frequency of 1.6 GHz as compared with the default frequency of 2.26 GHz. By slowing down the frequency of the servers, $T_{95}$ naturally increases. It is found that all the DCMs, except for the AutoScale DCM policy, fall apart with respect to $T_{95}$. The reason is that these other DCMs provision capacity is based on the request rate. Since the request rate has not changed as compared to table 400 of FIG. 4, they typically end up under-provisioning, now that servers are slower. The AlwaysOn DCM policy, in contrast, does not fall apart because even in table 400 of FIG. 4, it is greatly over-provisioning by provisioning for the peak load at all times. Since the AutoScale DCM policy is robust to all changes in load, it provisions correctly, resulting in acceptable $T_{95}$ values. $P_{avg}$ and $N_{avg}$ values for the AutoScale DCM policy continue to be much lower than that of the AlwaysOn policy, similar to table 400 of FIG. 4. Tables 900, 1000, and 1100 of FIGS. 9, 10, and 11, respectively, clearly indicate the superior robustness of the AutoScale DCM policy, which uses $n_{sys}$ to respond to changes in load, allowing this DCM policy to respond to all forms of changes in load. While we only showed results for load changes caused by changes in request size and server speed, the robustness component of the AutoScale DCM can also be used to handle other forms of load changes such as slow networks, server failures, etc.

Exemplary Computing Resource

Figure 12:
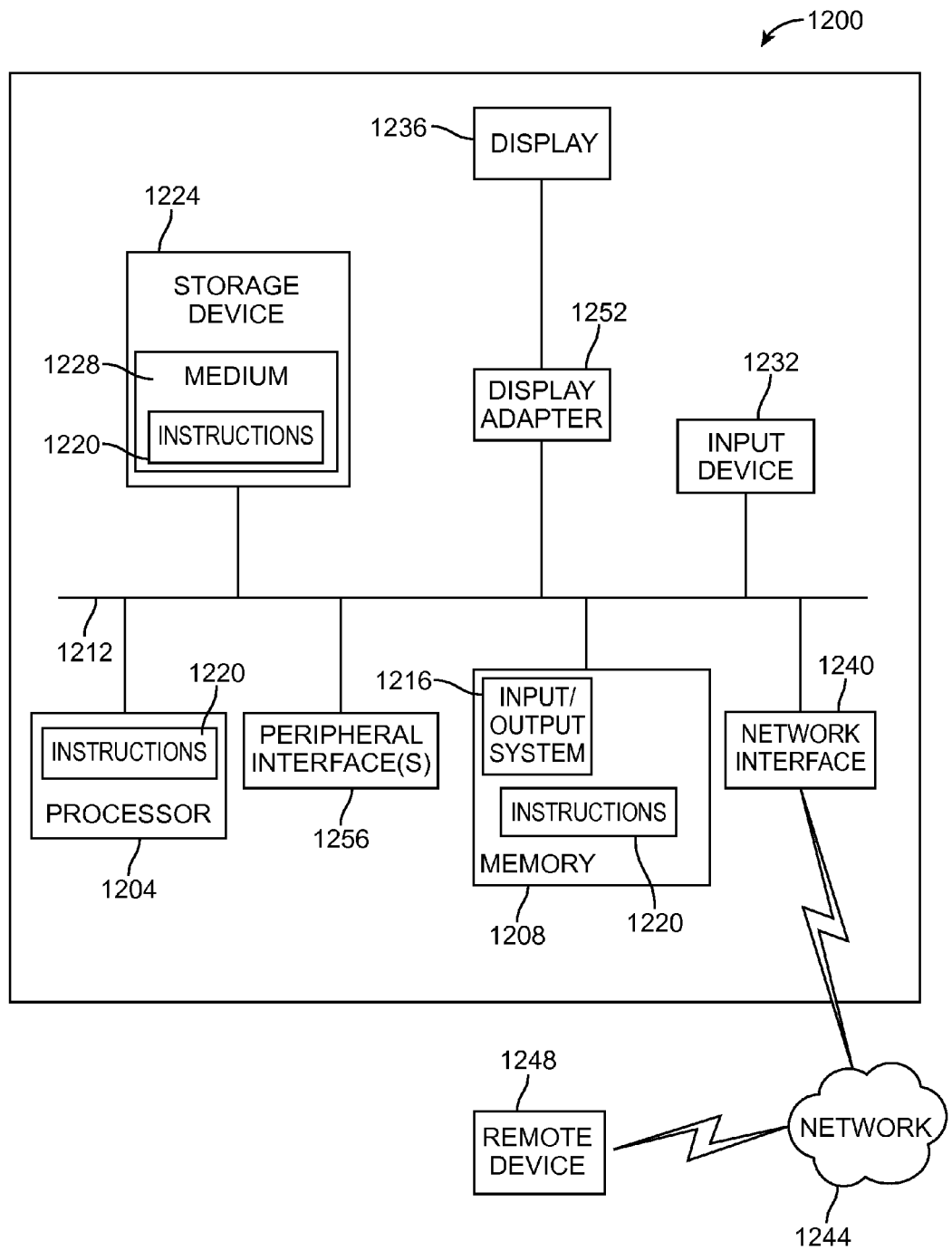
FIG. 12 is a high-level diagram of an exemplary software-driven machine capable of implementing systems and methods of the present invention.

FIG. 12 shows a diagrammatic representation of one embodiment of a software-driven computing resource in the exemplary form of a computer system 1200 within which a set of instructions for causing implementing state-change delays (e.g., via one or more delay timers 108(1) to 108(N), routing scheme 112, and/or robustness-control scheme 124, to perform any one or more of the aspects and/or methodologies of the present disclosure. As an example, computer system 1200 can be used as any one of servers 104 of system 100 of FIG. 1. It is contemplated that multiple computing devices may be utilized to implement a specially configured set of instructions for causing the device to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Memory 1208 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable storage media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable storage medium 1228 may provide nonvolatile and/or volatile storage of machine-readable instructions, data structures, program modules, and/or other data for computer system 1200. In one example, software 1220 may reside, completely or partially, within machine-readable storage medium 1228. In another example, software 1220 may reside, completely or partially, within processor 1204. It is noted that the term "machine-readable storage medium" does not include signals present on one or more carrier waves.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240 may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide a graphical representation of a utility resource, a location of a land parcel, and/or a location of an easement to a user. In addition to a display device, a computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of controlling a plurality of computing resources each having a lower-setup-cost state and a higher-setup-cost state, comprising:
    arranging the plurality of computing resources so that each is capable of processing at least a share of an incoming request stream;
    controlling each of the plurality of computing resources so that each switches from the lower-setup-cost state to the higher-setup-cost state as a function of a timing-out of a state-change delay timer that is initiated when that computing resource is idled; and
    determining a minimum number, k.sub.reqd, of the plurality of computing resources to be in the lower-setup-cost state and overriding ones of the state-change delay timers as needed to keep the minimum number of the plurality of computing resources in the lower-setup-cost state;
    wherein:
    said determining includes determining k.sub.reqd as a function of a total number of requests currently distributed among the plurality of computing resources and further as a function of a packing factor and a number, k, of the plurality of computing resources currently in the lower-setup-cost state.

2. A method according to claim 1, wherein: k.sub.reqd=k (p.sub.srv/p.sub.ref) where: p.sub.srv=an average request size multiplied by a request rate into one of the plurality of computing resources, as based on k and the total number of requests currently distributed among the plurality of computing resources, and p.sub.ref=the packing factor multiplied by the average request size.

3. A method according to claim 1, further comprising setting each state-change delay timer as a function of an arrival rate of the incoming request stream.

4. A processing system for processing an incoming request stream, comprising:
    a plurality of computing resources each capable of processing at least a share of the incoming request stream and having a lower-setup-cost state and a higher-setup-cost state;
    a load balancer comprising at least one processor designed and configured to distribute new arrivals within the incoming request stream among said plurality of computing resources;
    a state-change delay timer for each of said plurality of computing resources;
    wherein:
    said state-change delay timer is designed and configured to start running as a function of the corresponding one of said plurality of computing resources becoming idle;
    and the corresponding one of said plurality of computing resources is switched from said lower-setup-cost state to said higher-setup-cost state as a function of a timing-out of said state-change delay timer;
    and a robustness controller designed and configured to determine a minimum number, k.sub.reqd, of said plurality of computing resources to be in said lower-setup-cost state and override ones of said state-change delay timers as needed to keep the minimum number of said plurality of computing resources in said lower-setup-cost state;
    wherein:
    said robustness controller is designed and configured to determine k.sub.reqd as a function of a total number of requests currently distributed among said plurality of computing resources and further as a function of a packing factor and a number, k, of said plurality of computing resources currently in said lower-setup-cost state.

5. A system according to claim 4, wherein: $k_{reqd}=k(p_{srv}/p_{ref})$ where: $p_{srv}$=an average request size multiplied by a request rate into one of said plurality of computing resources, as based on k and the total number of requests currently distributed among said plurality of computing resources, and $p_{ref}$=the packing factor multiplied by the average request size.

6. A system according to claim 4, further comprising a timer controller in operative communication with each of said plurality of computing resources and designed and configured to set each state-change delay timer as a function of an arrival rate of the incoming request stream.

7. A machine readable storage medium containing machine-executable instructions for controlling a plurality of computing resources in processing an incoming request stream, wherein each of the plurality of computing resources has a lower-setup-cost state and a higher-setup-cost state, said machine-executable instructions comprising:
   a first set of machine-executable instructions for distributing new arrivals in the incoming request stream as a function of a packing factor;
   wherein each of the plurality of computing resources has a state-change delay timer and said machine-executable instructions further includes machine-executable instructions for determining a minimum number, $k_{reqd}$, of the plurality of computing resources to be in the lower-setup-cost state and overriding ones of the state-change delay timers as needed to keep the minimum number of the plurality of computing resources in the lower-setup-cost state;
   and wherein:
   said machine-executable instructions further includes machine-executable instructions for determining $k_{reqd}$ as a function of a total number of requests currently distributed among the plurality of computing resources and further as a function of a packing factor and a number, k, of the plurality of computing resources currently in the lower-setup-cost state.

8. A machine-readable storage medium according to claim 7, wherein said machine-executable instructions further includes machine-executable instructions for executing the equation $k_{subseqd}=k(p_{srv}/p_{ref})$ where: $p_{srv}$=an average request size multiplied by a request rate into one of the plurality of computing resources, as based on k and the total number of requests currently distributed among the plurality of computing resources, and $p_{ref}$=the packing factor multiplied by the average request size.

9. A machine-readable storage medium according to claim 7, wherein each of the plurality of computing resources has a state-change delay timer and said machine-executable instructions further include machine-executable instructions for setting each state-change delay timer as a function of an arrival rate of the incoming request stream.

* * * * *